(12) United States Patent
Wu

(10) Patent No.: US 8,468,200 B2
(45) Date of Patent: Jun. 18, 2013

(54) RETRANSMISSION ADMISSION MECHANISM IN A MANAGED SHARED NETWORK WITH QUALITY OF SERVICE

(75) Inventor: Zong Liang Wu, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 420 days.

(21) Appl. No.: 12/688,559

(22) Filed: Jan. 15, 2010

(65) Prior Publication Data

US 2010/0185731 A1    Jul. 22, 2010

Related U.S. Application Data

(60) Provisional application No. 61/145,181, filed on Jan. 16, 2009.

(51) Int. Cl.
*G06F 15/16* (2006.01)

(52) U.S. Cl.
USPC ........... 709/204; 709/226; 370/218; 370/235; 370/395.21; 370/400; 714/748

(58) Field of Classification Search
USPC ............. 709/204, 226; 370/218, 235, 395.21, 370/400; 714/748
See application file for complete search history.

(56) References Cited

U.S. PATENT DOCUMENTS

| 2003/0072264 | A1* | 4/2003 | Mo et al. ........................ 370/235 |
| 2008/0117919 | A1* | 5/2008 | Kliger et al. ................... 370/400 |
| 2008/0117929 | A1* | 5/2008 | Kliger et al. ................... 370/442 |
| 2008/0192752 | A1* | 8/2008 | Hyslop et al. ............. 370/395.21 |
| 2010/0180171 | A1* | 7/2010 | Liu et al. ........................ 714/748 |

FOREIGN PATENT DOCUMENTS

WO    WO 2008101112 A2 *    8/2008

* cited by examiner

*Primary Examiner* — Ario Etienne
*Assistant Examiner* — Michael C Lai
(74) *Attorney, Agent, or Firm* — Bruce Greenhaus; Richard Bachand; Sheppard Mullin Richter & Hampton LLP

(57) ABSTRACT

According to various embodiments of the disclosed method and apparatus, a node on a network submits to a network controller a request for the admission of a parameterized Quality of Service flow with in a MoCA network. A network controller receives the submission requesting creation of or update to a parameterized quality of service to support a flow with retransmission; sends a message to a first plurality of nodes in the network to request information from the first plurality of nodes regarding whether the retransmission flow can be created or updated; receives responses from the first plurality of nodes, wherein each response comprises information regarding whether its respective node can support the retransmission flow; and determines whether the retransmission flow can be supported by the first plurality of network nodes.

14 Claims, 6 Drawing Sheets

RETRANSMISSION ADMISSION MECHANISM IN A MANAGED SHARED NETWORK WITH QUALITY OF SERVICE

CROSS-REFERENCE TO RELATED APPLICATIONS

This application claims the benefit of U.S. Provisional Application No. 61/145,181, filed Jan. 16, 2009, which is herein incorporated by reference in its entirety.

TECHNICAL FIELD

The presently disclosed method and apparatus relates generally to communication networks, and more particularly, some embodiments relate to retransmission mechanisms to reduce packet error rate.

DESCRIPTION OF THE RELATED ART

A home network may include multiple types of subscriber equipment configured to deliver subscriber services throughout the home. These subscriber services include delivering multimedia content, such as streaming audio and video, through the home network to subscriber equipment, where it is presented to a user. As the number of available subscriber services has increased and they become more popular, the number of devices being connected within each home network has also increased. The increase in the number of services and devices increases the complexity of coordinating communication between the network nodes.

Home networks typically specify quality of service (QoS) parameters to ensure that user content is delivered within an expected quality standards. This can help to ensure satisfaction in the user experience. The MoCA (Multimedia over Coax Alliance) network, for example utilizes a centralized network controller to set up parameterized quality of service (PQoS) standards for network communications among nodes. Typically, a unidirectional traffic stream of data packets identified by a "Flow ID" with guaranteed resources, transmitting from a single node to one or more other nodes is referred to as a parameterized quality of service (PQoS) flow.

Some communications networks have an optional retransmission mechanism in order to reduce the packet error rate. Due to the lapse in time between transmission of a packet and the acknowledgement of the reception of that packet, the transmitter must keep each transmitted packet in its buffer until the packet is acknowledged or a predetermined amount of time elapses indicating that the packet was received. For some managed shared networks with Quality of Service, this can be the length of a MAP (Media Access Plan) cycle of the network. In addition, the receiver must keep the packets in the order that they were received and present the received packets in proper sequence to an application (i.e., a function or higher software layer). If a packet is corrupted, the receiver must wait for the retransmission of that packet or a timeout before it can present those packets that follow the corrupted packet to its application. While waiting for the retransmission or the timeout, those packets must remain in the receive buffer.

BRIEF SUMMARY

According to various embodiments of the disclosed method and apparatus, nodes on a network (also referred to as network devices) are programmed to generate and submit a request to a network controller to initiate a PQoS transaction to create or update a parameterized Quality of Service (PQoS) flow with packet retransmission. According to one embodiment, in order to enable retransmission for a PQoS flow, a setup/admission process is provided to ensure that appropriate node-level resources (including transmit buffer and receive buffer and related processing power in the transmitter and receiver respectively) and network level resources (such as, for example, network time-slots) are allocated. In accordance with one embodiment of the disclosed method and apparatus, the admission process is implemented to ensure compatibility before the retransmission is enabled. The presently disclosed method and apparatus extends the PQoS admission protocol disclosed in the MoCA 1.1 standard generated and published by the Multimedia over Coax Alliance. The PQoS admission protocol is extended to support the admission of a PQoS flow that uses retransmission for lost or corrupted packets in order to achieve a better packet error rate than may otherwise be possible without retransmission.

In one embodiment of the disclosed method and apparatus, retransmission of lost/corrupted packets uses additional network level and node level resources (buffer space, processing capability and management), beyond what is implied by the Traffic Specification (TSpec) provided in MoCA 1.1, which defines both the network level and node level resources. Accordingly, a new parameter called "NUMBER_RETRY" is introduced in addition to the TSpec parameters during the PQoS admission process. NUMBER_RETRY defines the maximum number of retransmissions requested for the lost/corrupted packets, with a value "0" indicating no retransmission requested. Retransmission is enabled/disabled on a PQoS flow basis. In accordance with one embodiment of the disclosed method and apparatus, only unicast PQoS flows use retransmission. The method and apparatus disclosed herein frequently refers to MoCA as an example application. However, the systems and methods disclosed herein are applicable to any other network with a coordinated network controller. These systems and methods can be useful with networks that perform retransmission but experience large latency of packet acknowledgement at layer 2 thus needing large buffer space.

According to various embodiments, a method for retransmission admission in a MoCA network having a network controller node and a plurality of associated network nodes includes the operations of receiving in the network controller node a submission requesting creation of or update to a parameterized quality of service to support a flow with retransmission (sometimes referred to as a retransmission, flow); the network controller node sending a message to a first plurality of nodes in the network to request information from the first plurality of nodes regarding whether the retransmission flow can be created or updated; the network controller node receiving responses from the first plurality of nodes, wherein each response comprises information regarding whether its respective node can support the retransmission flow; and the network controller node determining whether the retransmission flow can be supported by the first plurality of network nodes. In addition, in some embodiments the network controller informs network nodes regarding whether the retransmission flow can be supported. The information regarding whether a node can support a retransmission flow in one embodiment comprises packet size, peak packet rate, burst characteristic, and buffer space available to support retransmission.

Further, in another embodiment, the determining in operation is based on sufficiency of resources on an ingress node, sufficiency of resources on an egress node, a quantity of supported retransmission flows, supported burst size of a node, and sufficiency of aggregated slot times in the network. In yet another embodiment, the determining is based on a cost of flow as a measure of specific bandwidth required to support the retransmission flow. The cost of flow is calculated in one implementation as $$CoF = N_{TXPS} * \max\left(T8, \left\{\frac{\left[\left(\frac{8*N_F}{OFDM_B}\right)\right]*}{(T_{CP} + T_{FFT}) + T_{IFG} + T_{PRE}}\right\}\right)$$

where T8 is a minimum packet size, NTXPS is a total number of flow transmissions per second, NF is a number of bytes transmitted per flow transmission, OFDMB is a number of bits per OFDM (Orthogonal Frequency Division Multiplexing) symbol, TCP is a cyclic prefix length, TFFT is an IFFT/FFT (Inverse Fast Fourier Transform/ Fast Fourier Transform) period, TIFG is an IFG period and TPRE is a length of the preamble per packet.

In one embodiment, the network controller informs nodes of the network whether the retransmission flow can be supported, and network nodes for the retransmission flow commit requested resources to support the retransmission flow. The submission to the network controller can be configured to identify nodes that comprise the first plurality of nodes and can comprise information specifying network nodes that make up the first plurality of network nodes.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

The disclosed method and apparatus, in accordance with one or more various embodiments, is described in detail with reference to the following figures. The drawings are provided for purposes of illustration only and merely depict either typical embodiments or examples of particular embodiments. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the claimed invention should be limited only by the claims and the equivalents thereof.

DETAILED DESCRIPTION

According to various embodiments of the disclosed method and apparatus, nodes on a network (also referred to as network devices) are programmed to generate and submit a request to a network controller to request setup/admission of a parameterized QoS flow with retransmission requirement. According to one embodiment, a setup/admission process is provided to ensure that an appropriate transmit buffer and related processing capacity, and receive buffer and related processing capacity are allocated in the transmitter and receiver respectively. In accordance with one embodiment of the disclosed method and apparatus, the admission process is implemented to ensure compatibility before the retransmission is enabled.

Figure 1:
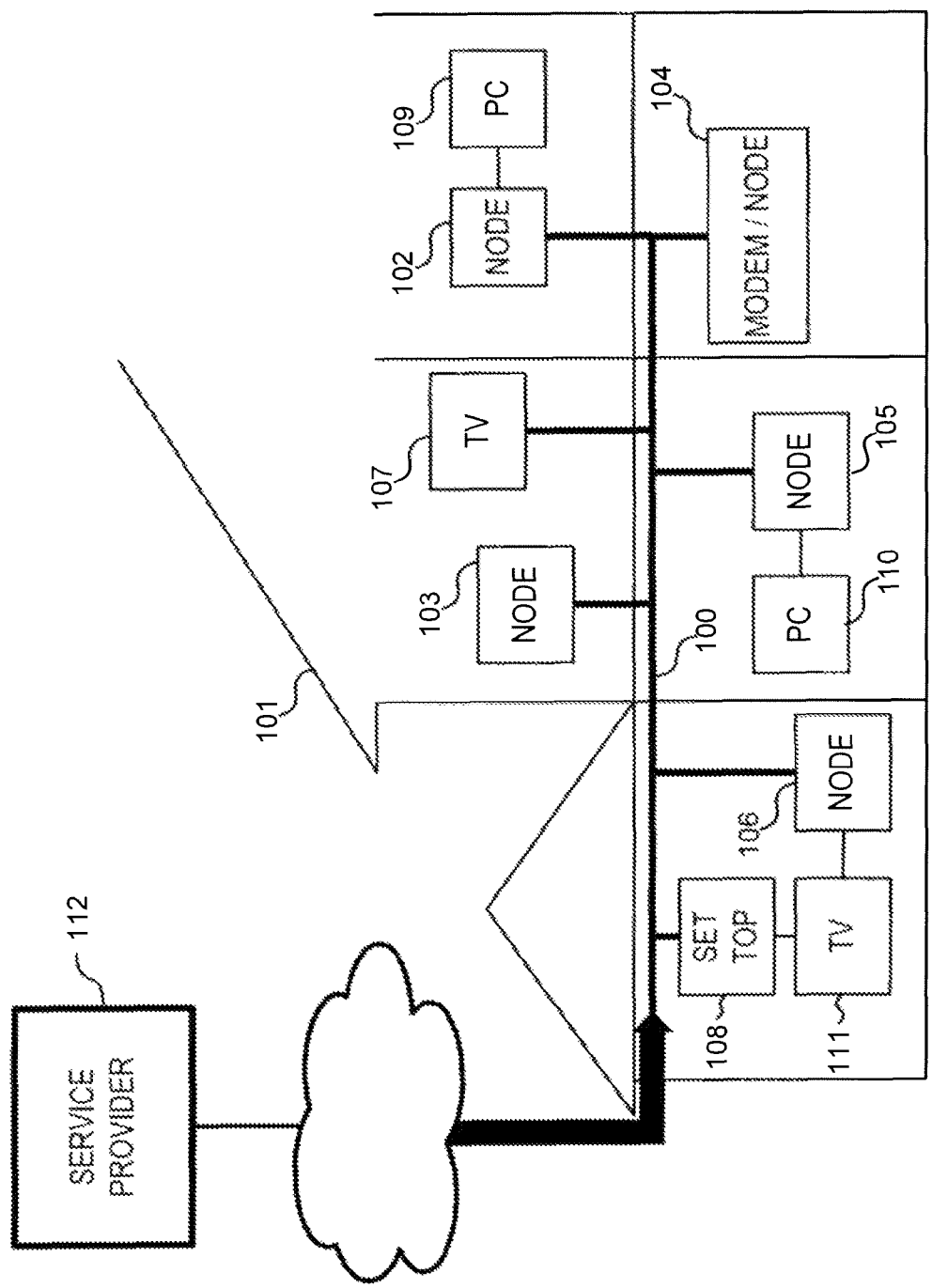
FIG. 1 illustrates an example of one environment in which some embodiments of the disclosed method and apparatus may be implemented.

Before describing the disclosed method and apparatus in detail, it is useful to describe an example of an environment in which the disclosed method and apparatus can be implemented. The network of FIG. 1 will be described for this purpose. A wired communications medium 100 is shown. In some embodiments, the wired communications medium might be a coaxial cable system, a power line system, a fiber optic cable system, an Ethernet cable system, or other similar communications medium. Alternatively, the communications medium might be a wireless transmission system. In the illustrated embodiment, the communications medium 100 is preinstalled coaxial cabling deployed within a residence 101.

The network comprises a plurality of network nodes 102, 103, 104, 105, 106 in communication according to a communications protocol. For example, the communications protocol might comprise a networking standard, such as the Multimedia over Coax Alliance (MoCA) standard. In the illustrated embodiment, the communications protocol specifies a packet based communications system. In this embodiment, physical layer (PHY) packets comprise preambles and payloads. A PHY preamble is typically inserted at the beginning of each packet to assist receivers in detecting and acquiring the physical layer parameters to properly decode the packet. The communications protocol may have a plurality of pre-defined PHY preambles to use with different types of network communications. For example, one type of preamble may be used when transmitting in a diversity mode (a communication mode in which little is known about the communication channel). Another type of preamble may be used when transmitting a media access plan (MAP) message. Other types of packets may use other types of preambles.

A PHY payload is used to transmit the data content of the packet. In some cases, the PHY payload has a predetermined format. For example, in a MoCA network, network maintenance messages and MAP messages each have a format that is determined by the MoCA protocol. In other cases, the PHY payload may have undetermined format. For example, the PHY payload of a media streaming transmission might comprise an embedded Ethernet packet or a portion thereof.

In some embodiments, activity on the network is controlled by a network controller (NC) node. In one such embodiment, one of the nodes is selected to perform the functions of the network controller based upon a process defined by the communications protocol. In networks employing an network controller, the network controller schedules network communications between network nodes using a MAP. The MAP is sent as a packet. Such MAP packets are sent on a regular basis. MAPs are generated in response to reservation requests by the nodes of the network. The network controller also performs admission procedures when a new node requests admission to the network.

Nodes described herein can be associated with a variety of devices. For example, in a system deployed in a residence 101, a node may be a network communications module associated with one of the computers 109 or 110. Such nodes allow the computers 109, 110 to communicate on the communications medium 100. Alternatively, a node may be a module associated with a television 111 to allow the television to receive and display media streamed from one or more other network nodes. A node might also be associated with a speaker or other media playing devices 103 that plays music. A node might also be associated with a module configured to interface with an internet or cable service provider 112, for example to provide Internet access, digital video recording capabilities, media streaming functions, or network management services to the residence 101.

In one embodiment in a MoCA environment, any Level 2 Management Entity (L2ME) capable node can start a PQoS Transaction in the Network. The network coordinator or network controller (NC) node is responsible for admitting the PQoS Flow to the MoCA network by first requesting each node to provide resource utilization information. The admission can be done either with or without enabling retransmission capability. If there are sufficient resources to admit the flow, the network controller node then guarantees availability of sufficient transmission opportunities to the flow. If there are insufficient resources, the network controller node denies the requested flow and supplies additional information about remaining resources. The PQoS Flow transactions for MoCA devices can be classified into two main groups. One group is Admission control PQoS Flow transactions, which include: Create PQoS Flow transaction; Update PQoS Flow transaction; and Delete PQoS flow transaction. Another group is Flow management PQoS transactions, which include: List PQoS Flow transaction; Query PQoS Flow transaction; and Maintenance PQoS Flow transaction.

In one embodiment, A PQoS flow can be transmitted from one ingress node to either a single egress node or to multiple egress nodes. An ingress node is a node into which PQoS flow traffic enters a network. An egress node is a node from which parameterized QoS flow traffic exits a network. Note that PQoS flows with multiple egress nodes are transmitted using the ingress node's Greatest Common Denominator (GCD) physical layer (PHY) profile (also referred to as the broadcast profile). The GCD is a modulation format computed by a node for transmission to multiple recipient nodes. The GCD PHY profile is the modulation density used for a group of subcarriers, chosen to be the greatest constellation density supported by all of the subcarriers for all of the nodes on the network. The egress node ID is preferably set to 0x3F for a PQoS Flow transmitted using GCD PHY profile.

The system and method described herein can be used to create or update flow transactions. Accordingly, some embodiments define Create or Update Flow Transactions to create a new PQoS Flow or to update attributes of an existing PQoS Flow. One example use of an Update Flow Transaction is to change flow attributes in response to starting/stopping trick mode play. Another example is changing Flow attributes in response to changes in available MoCA Network bandwidth. In one embodiment, any node can be configured to request creation or update of any PQoS Flow. In the examples described herein, both the Create PQoS Flow and Update PQoS Flow Transactions are performed in three L2ME Waves. The messages exchanged during these Transactions are described in detail below.

Figure 2:
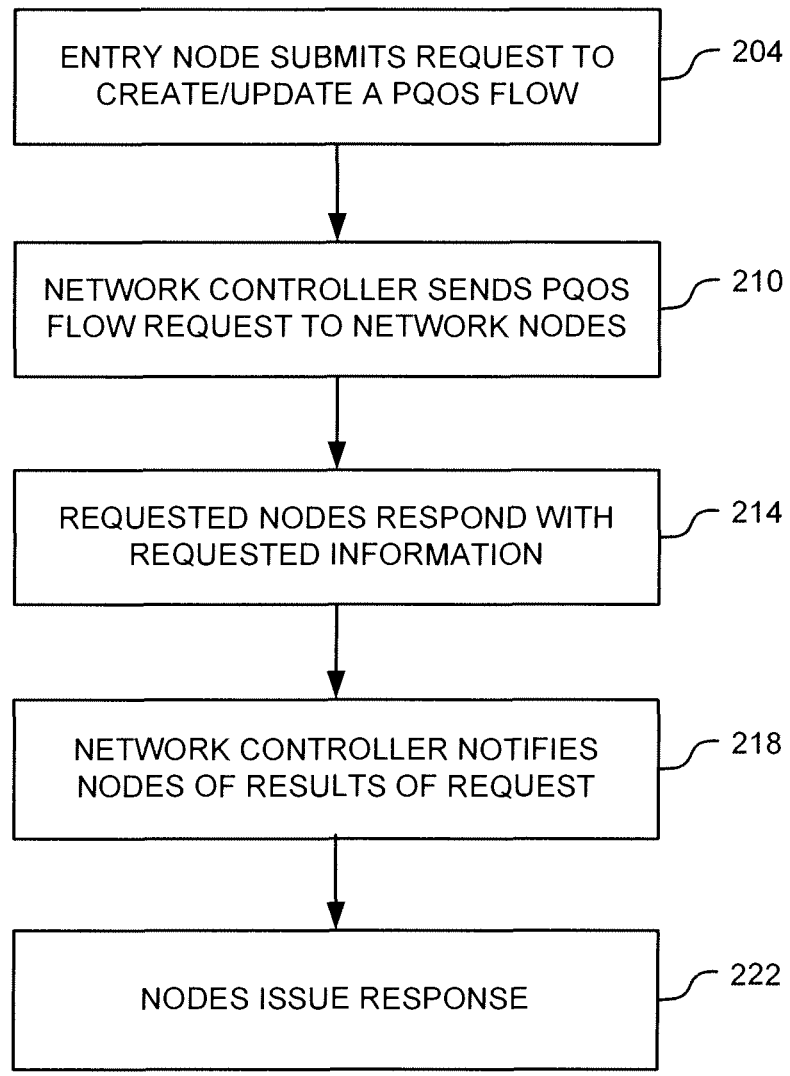
FIG. 2 is a diagram illustrating an example process for retransmission admission in accordance with the system and method described herein.

Before describing examples of the process in detail, an overview of the process is first described. FIG. 2 is a diagram illustrating an example process for retransmission setup in accordance with one embodiment of the systems and methods described herein. Referring now to FIG. 2, in operation 204 a node in the network submits information to setup a retransmission protocol. For example, an entry node submits a request to create or update a PQoS Flow. In one embodiment, the request is sent to a network controller or network coordinator node for the network. FIG. 2 is described in terms of an example embodiment using a network controller node.

In operation 210, the network controller sends a PQoS flow request to the network nodes. The request includes a request for information from the nodes that is material to supporting retransmission in the network. This includes, for example, a request to determine whether the nodes support the PQoS flow with retransmission when necessary, whether there is enough buffer size and processing capacity, and so on. In one embodiment, this is broadcast to all network nodes. In another embodiment, the requesting node identifies nodes to participate in the PQoS flow, and the network controller node sends its request to the identified nodes.

In operation 214, the requested nodes respond to the network controller with the requested information. In one embodiment, the response from a node includes information indicating whether the node can support the flow with retransmission, whether it has enough buffer size and processing capacity, and whether it is an ingress/egress node.

In operation 218, the network controller receives the information from the requested nodes. Once the information is received, the network controller evaluates the information and notifies one or more nodes in the network of the results. In one embodiment, only the entry node is notified of the results. In other embodiments, multiple nodes or all nodes are notified. Then, in step 222 the notified nodes issue their response to close the transaction.

Figure 3:
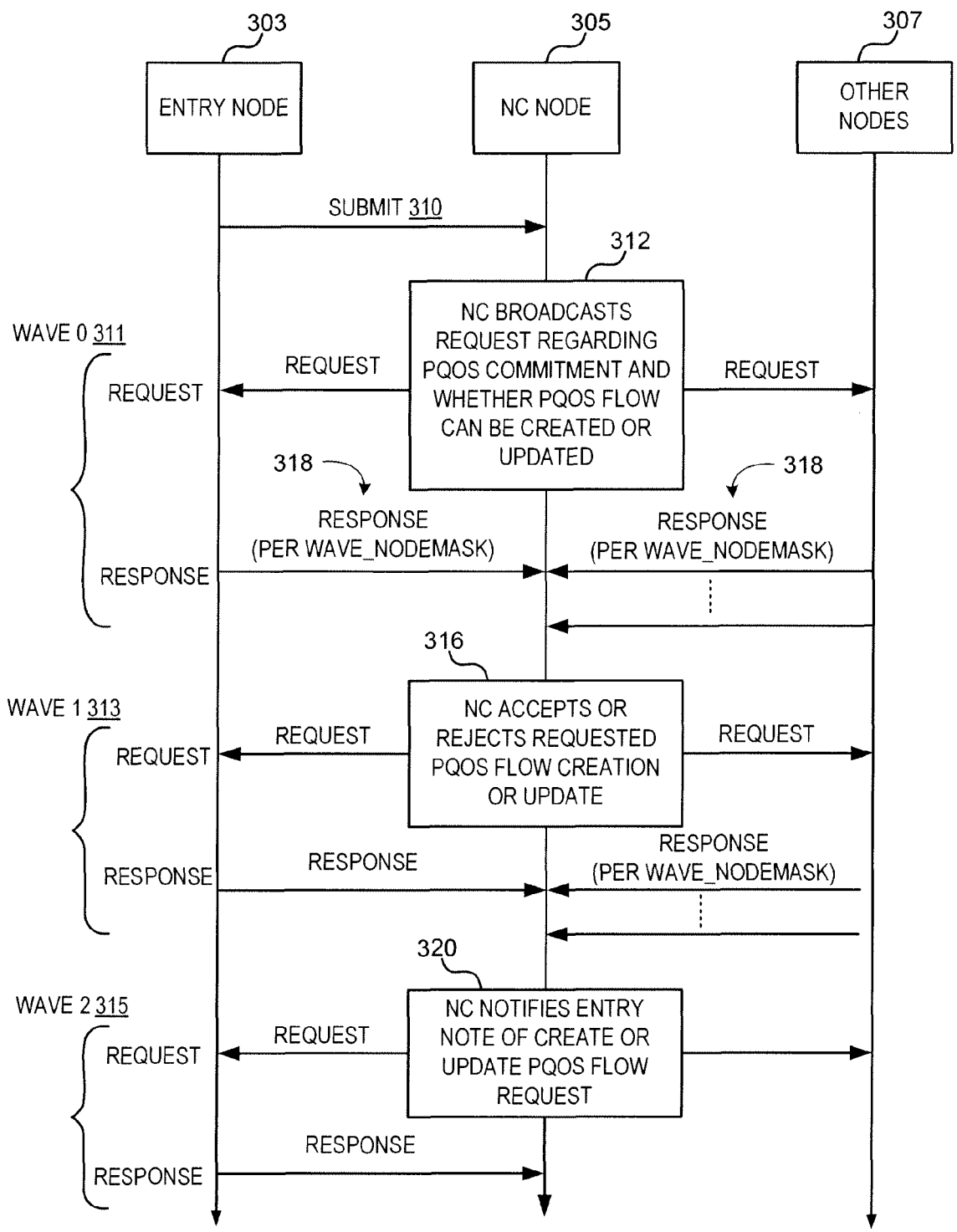
FIG. 3 is a diagram illustrating an example flow of messages exchanged for retransmission admission in accordance with one embodiment of the method and apparatus described herein.
Figure 4:
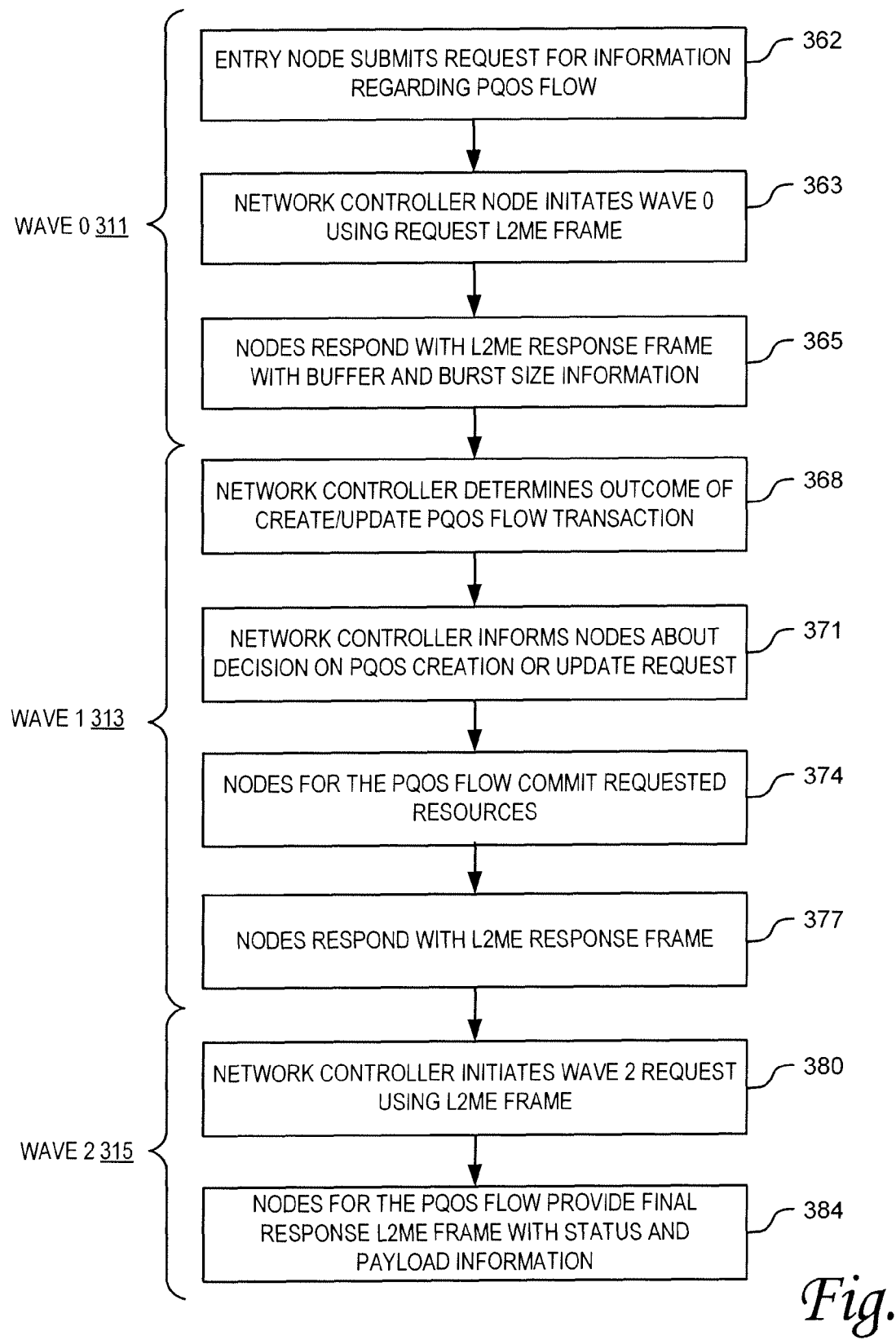
FIG. 4 is a diagram illustrating an example process for retransmission admission in accordance with the example message flow illustrated in FIG. 3.

FIG. 3 is a diagram illustrating an example flow for retransmission admission in accordance with one embodiment of the systems and methods described herein. FIG. 4 is a diagram illustrating an example process for the retransmission admission flow illustrated in FIG. 3. This example process is now described with reference to FIGS. 3 and 4. In this example a network of nodes 307 includes a network controller node 305. An entry node 303 is illustrated as requesting creation of or an update to a PQoS flow. Accordingly, in operation 362, entry node 303 submits a request to network controller node 305 for information regarding, creation of or an update to a PQoS flow for retransmission. To begin the creation or update of a PQoS Flow in the MoCA Network, the Entry Node preferably transmits a "Submit L2ME" frame to the network controller. The following additional constraints are preferably observed on various field of the Submit L2ME frame.

VENDOR_ID=0x0 (MoCA)

TRANS TYPE=0x1 (QoS)

TRANS_SUBTYPE=0x1 (Create PQoS Flow) 0x2 (Update PQoS Flow)

WAVE0_NODEMASK=Set to indicate all L2ME-capable nodes in the MoCA Network

MSG PRIORITY=0xF0

TXN LAST WAVE NUM=2

L2ME PAYLOAD=as shown in Table 1

Table 1 provides an example of a Submit 310 as an L2ME payload for a create and update PQoS flow.

TABLE 1

Submit L2ME Payload

| Field | Length | Usage |
| --- | --- | --- |
| Submit L2ME Payload for Create PQoS Flow and Update PQoS Flow | | |
| FLOW_ID | 48 bits | Unique identification number of the PQoS Flow |
| RESERVED | 16 bits | Type III as defined in the MoCA 1.1 Specification |
| T_PACKET_SIZE | 16 bits | Packet size in bytes used in the calculations of decision to admit or update the Flow. |
| RESERVED | 8 bits | Type III as defined in the MoCA 1.1 Specification |
| INGRESS_NODE_ID | 8 bits | If TRANS_SUBTYPE = 1, Node ID for the ingress node of the PQoS Flow, otherwise Type II reserved |
| RESERVED | 24 bits | Type III as defined in the MoCA 1.1 Specification |
| EGRESS_NODE_ID | 8 bits | If TRANS_SUBTYPE = 1, Node ID of the egress node of a Point-to-Point PQoS Flow; 0x3F for a Broadcast PQoS Flow; for other TRANS_SUBTYPE values, Type II reserved |
| FLOW_TAG | 32 bits | Application specific content |
| PACKET_DA | 48 bits | DA of Ethernet packets of the PQoS Flow |
| RESERVED | 24 bits | Type III as defined in the MoCA 1.1 Specification |
| T_PEAK_DATA_RATE | 24 bits | 0-0xFFFFFE; Peak data rate (kb/s) 0xFFFFFF = query data rate. QoS Flow is not created. |
| T_LEASE_TIME | 32 bits | Lease time (seconds). |
| T_BURST_SIZE | 8 bits | See definition of TSPEC parameters in the text below this table |
| MAX_NUMBER_RETRY | 1 bits | Maximum number of retransmission attempts for each packet of the PQoS flow. 0 = no retransmission requested |
| RESERVED | 24 bits | Type III as defined in the MoCA 1.1 Specification |

In one embodiment, a node does not admit a retransmission flow unless it can support continuous packet units of the packet size at the peak packet rate, with a given burst characteristic, and with enough buffer space to support retransmission. Accordingly, in the above example, T_PACKET_SIZE, T_PEAK_DATA_RATE, T_BURST_SIZE, and MAX_NUMBER_RETRY are used to determine whether a flow can be supported. A node preferably does not admit a PQoS Flow unless it can support continuous PDUs of the T_PACKET_SIZE at the T_PEAK_DATA_RATE with a burst characteristic controlled by T_BURST_SIZE, and with enough buffer space for retransmission (when requested). The Injection Bit Rate of a PQoS Flow is defined as the ratio of the total bits in (T_BURST_SIZE+1) last received PDUs of the PQoS Flow divided by the total time it took to transfer the same PDUs into the MoCA ECL of the ingress node. The Injection PDU Rate of a PQoS Flow is defined as the value of (T_BURST_SIZE+ 1) divided by the time it took to transfer (T_BURST_SIZE+1) PDUs into the MoCA ECL.

In one embodiment, for each admitted flow, every node is preferably able to sustain the PQoS Flow as long as the following requirements are satisfied:
  The Injection Bit Rate is always less than or equal to the PQoS Flow's T-PEAK-DATA-RATE.
  The Injection PDU Rate is always less than or equal to the PQoS Flow's T PEAK DATA RATE/T PACKET SIZE.
  The length of all injected PDUs is less than or equal to T_PACKET_SIZE.

In embodiment, the attributes of a PQoS Flow are described by the TSPEC parameters and the MAX_NUMBER_RETRY requirement. Examples of how these parameters are used by all other nodes in the MoCA Network are described below. These include a description of the network controller node and how it determines whether to allow creation of the requested PQoS Flow with or without retransmission.

In operation 363, the network controller node 305 initiates a wave 0 for the process. In one MoCA embodiment, the wave 0 311 is initiated using a request L2ME frame 312. In this example, wave 0 311 informs all the nodes 303, 307 about the proposed PQoS Flow Creation or Update operation, and collects information about current flow allocations from the nodes 307, 303. The network controller node 305 initiates Wave 0 311 using a Request L2ME Frame with format and based on the submit 310 shown in Table 1.

At operation 365 the nodes 303, 307 respond to the request. In the illustrated example of Wave 0 311, each node responds to the network controller node 305 with an L2ME Response Frame 318. In one embodiment, this response indicates the summed up costs of existing PQoS Flows. The Response L2ME Frame for Create PQoS Flow/Update Flow Transaction follows the L2ME format. In this example, the following additional constraints are observed
  RESP STATUS=Bit 0 set to '1'
  L2ME PAYLOAD=as defined in Table 2.

Table 2 is an example of an L2ME PAYLOAD for the L2ME response frame for Create PQoS Flow and Update Flow.

TABLE 2

L2ME Response Payload

| Field | Length | Usage |
| --- | --- | --- |
| Response L2ME Payload for Create Flow/Update Flow | | |
| RESERVED | 8 bits | Type III as defined in the MoCA 1.1 Specification |
| RESPONSE_CODE | 8 bits | As defined in Table 3 |
| RESERVED | 16 bits | Type III as defined in the MoCA 1.1 Specification |
| EXISTING_STPS | 32 bits | Duration in multiple of SLOT_TIME/second for the set of existing PQoS Flows for which this node is the ingress node. If not an ingress node for any Flow in the MoCA Network, set to '0x00000000' See text below this Table regarding how to calculate this field. |
| EXISTING_TXPS | 32 bits | PQoS Flow transmissions/second for the set of existing flows for which this node is the ingress node. If not an ingress node for any Flow in the MoCA Network, set to '0x00000000' See text below this Table regarding how to calculate this field. |
| COST_STPTX | 32 bits | Ingress node's cost of new or updated PQoS Flow (multiple of SLOT_TIME/Flow transmission); if not an ingress node set to '0x00000000' |
| COST_TXPS | 32 bits | Ingress node's calculation of the required number of PQoS Flow transmissions/second for the specified flow; if not an ingress node set to '0x00000000' |
| REM_NODE_CAPACITY | 32 bits | If this node is the ingress or the egress node for the PQoS Flow, the peak data rate (kb/s) that this node can commit to this PQoS Flow for the requested PQoS Flow's T_PACKET_SIZE. This value may be more or less than the requested peak data rate. If this node is the ingress or the egress node and has no effective upper limit on the remaining node capacity, it may set this field to 0xFFFFFFFF If this node is not the ingress or the egress node for the requested PQoS Flow, set to 0xFFFFFFFF |
| REM_BURST_SIZE | 8 bits | If this node is an egress node for the PQoS Flow, the maximum T_BURST_SIZE value for which this node can accept the PQoS Flow Create/Update Transaction for the requested PQoS Flow's T_PACKET_SIZE. This value may be more or less than the requested T_BURST_SIZE value. This value may be set to 0xFF if this node has no effective upper limit on packet burst size it can accept, If not an egress node for this PQoS Flow, set this field to 0xFF |
| RETRANSMISSION_BUFFER_OK | 32 bits | 1: yes 0: No |
| REM_BURST_SIZE_RETRANSMISSION | 8 bits | If this node is an egress node for the PQoS Flow, the maximum T_BURST_SIZE value for which this node can accept the PQoS Flow Create/Update Transaction for the requested PQoS Flow's T_PACKET_SIZE with retransmission. This value may be more or less than the requested T_BURST_SIZE value. This value may be set to 0xFF if this node has no effective upper limit on packet burst size it can accept, If not an egress node for this PQoS Flow, set this field to 0xFF |
| RESERVED | 24 bits | Type III |

Figure 5:
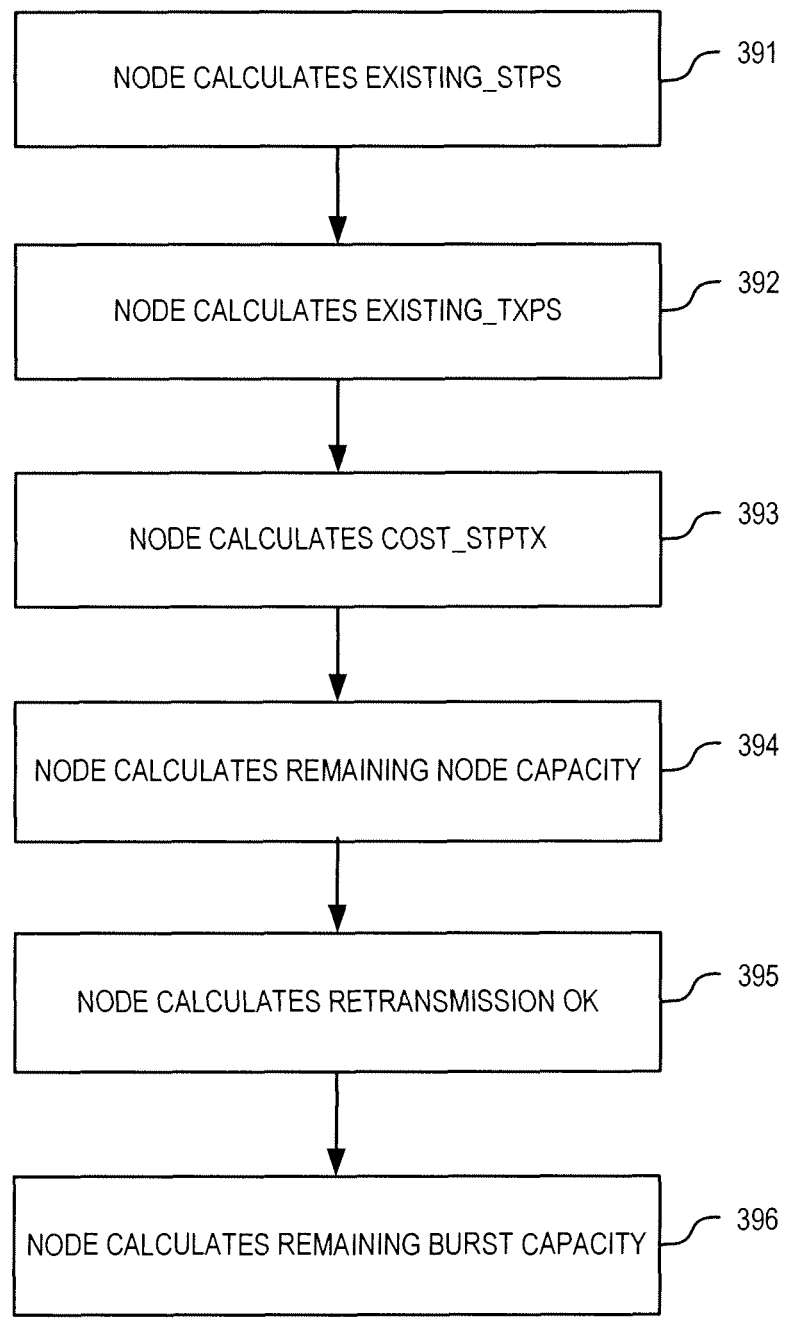
FIG. 5 is a diagram illustrating an example for calculating a Response to a Level 2 Management Entity (L2ME) frame in accordance with one embodiment of the systems and methods described herein.

FIG. 5 is a diagram illustrating an example for calculating the Response to L2ME frame in accordance with one embodiment of the systems and methods described herein. In this example, at operation 391, each requested node calculates the "Response L2ME" frame's payload by calculate the EXISTING_STPS value which is the sum of the cost of the flow for all the existing PQoS Flows excluding the new or updated PQoS Flow in which the node is an ingress node. The contribution of each PQoS Flow is the cost of flow and in one embodiment is calculated using Equation 1 set forth below. At operation 392, each node calculates the EXISTING_TXPS value for all the existing PQoS Flows excluding the new or updated PQoS Flow. This is the sum of the COST TXPS for each PQoS Flow for which this is the ingress node.

At operation 393, the nodes calculate the COST_STPTX parameter as the CoF of the new or updated PQoS Flow in multiple of SLOT_TIMES/PQoS Flow transmission according to Equation (1). At operation 394, if there are ingress or egress node limits on the PQoS Flow throughput, the nodes calculate the remaining node capacity in kilobits/second (REM_NODE_CAPACITY) as defined in Table 2. At operation 395 the nodes calculate RETRANSMISSION OK based on the available buffer size and buffer control logic. Then, at operation 396, if there are ingress or egress node limits on the PQoS Flow throughput, calculates the remaining Burst capacity (REM_BURST_SIZE_RETRANSMISSION).

Each requested node issues a RESPONSE_CODE where the list of acceptable values is shown in Table 3. If a node selects multiple RESPONSE_CODEs for rejection of a Create/Update Flow request, the decision regarding which RESPONSE_CODE value to include from among all selected RESPONSE_CODEs in the WAVE 0 L2ME Response message is the numerically highest RESPONSE_CODE.

If a node is able to fulfill the network controller node request, it issues a Response Code 0x1 or 0x2 as applicable.

TABLE 3

Example Response Code Values

| RESPONSE CODE NAME | Value | Description |
|---|---|---|
| RESPONSE_CODE_INGRESS | 0x1 | This code is selected by the ingress node for both Create and Update PQoS Flow Transaction if:<br>1. The node approves the Create/Update request; or<br>2. The node rejects the Create/Update request for bandwidth-related reason and provides a value in REM_NODE_CAPACITY field lower than the requested T_PEAK_DATA_RATE<br>All other nodes should not use this response code |
| RESPONSE_CODE_EGRESS | 0x2 | If the responding node is an egress node for the PQoS Flow, then the node selects this code for both Create and Update PQoS Flow transaction if:<br>1. The node approves the Create/Update request; or<br>2. The node rejects the Create/Update request for a bandwidth-related reason and provides a value in REM_NODE_CAPACITY field lower than the requested T_PEAK_DATA_RATE<br>All other nodes should not use this response code |
| RESPONSE_CODE_FLOW_EXISTS | 0x3 | This code should not be selected for Update Flow Transaction.<br>For Create Flow Transaction, this code should be selected by any node that currently has PQoS Flow resources allocated to a PQoS Flow with this FLOW_ID. |
| RESPONSE_CODE_TOO_MANY_FLOWS | 0x6 | This code should not be selected during Update Flow Transaction. This code should not be selected by nodes that are not ingress or egress for the specified flow. An egress node of the requested PQoS Flow should not select this code unless it is already the egress for at least N31 other PQoS Flows. The ingress node of the requested PQoS Flow should not select this code unless it is already the ingress node for at least N30 other PQoS Flows. |
| RESPONSE_CODE_INVALID_DA | 0x7 | The DA of the requested PQoS Flow is a unicast Ethernet address and the node does not support this feature. |
| RESPONSE_CODE_INVALID_TSPEC | 0x8 | The ingress node of the requested PQoS Flow selects this code if<br>1. requested T_PACKET_SIZE value is <64 B or >1518 B,<br>2. Egress node is the same as Ingress node ID |

TABLE 3-continued

Example Response Code Values

| RESPONSE CODE NAME | Value | Description |
|---|---|---|
| | | 3. burst size (T_BURST_SIZE) is less than 1 and/or greater than 9. Other nodes MAY also select this code if requested T_PACKET_SIZE value is <64 B or >1518 B. |
| RESPONSE_CODE_LEASE_EXPIRED | 0xA | This code should not be selected by any node during Create PQoS Flow Transaction. This code MUST be selected by the ingress node or the egress node of the PQoS Flow if the Update PQoS Flow Transaction is attempting to alter a PQoS Flow for which resources will be deleted within T37 due to lease expiration. |
| RESPONSE_CODE_UNINVOLVED | 0xB | A node that is not the ingress node or an egress node for the PQoS Flow MUST either select this code to accept the Create or Update Flow request or select another appropriate code in this Table to reject the Create or Update Flow request. Ingress or egress nodes for the requested PQoS Flow MUST NOT use this response code |
| RESPONSE_CODE_INGRESS_RETRY_OK | 0xC | This code is selected by the ingress node for both Create and Update PQoS Flow Transaction if RETRANSMISSION is OK All other nodes MUST NOT use this response code |
| RESPONSE_CODE_EGRESS_RETRY_OK | 0xD | If the responding node is an egress node for the PQoS Flow, then the node MUST select this code for both Create and Update PQoS Flow transaction if: RETRANSMISSION is OK All other nodes MUST NOT use this response code |

All RESPONSE_CODE values not listed in this table are Reserved for Future Use.

Next the network controller node 305 initiates wave 1 313. In Wave 1, the network controller node 305 determines the outcome of the Create PQoS Flow or Update PQoS Flow transaction and values of other fields of the Request message. This is illustrated by operation 368. Having made the determination, the network controller node 305 informs the nodes about the decision on the PQoS Flow Creation or Update request. This is illustrated by operation 371. This can be broadcast to all nodes or sent to specific nodes in the network.

Now described is an example of how the network controller node 305 calculates these values and makes the decision to either allow or reject the Create or Update Flow request. In this example, the network controller node 305 sends the Request L2ME Frame for Wave 1 using the format illustrated in Table 4. The following additional constraints are observed on various fields.

VENDOR ID=0x0 (MoCA)
TRANS_TYPE=0x1 (QoS)
TRANS_SUBTYPE=0x1 (Create PQoS Flow) 0x2 (Update PQoS Flow)
WAVE STATUS=0
DIR LEN=0x00
TXN WAVE N=0x1
L2ME PAYLOAD=as shown in Table 4.

TABLE 4

Example L2ME Payload

| Field | Length | Usage |
|---|---|---|
| Request L2ME Payload for Create Flow/Update PQoS Flow | | |
| DECISION | 8 bits | Decision values as defined in Table 5. |
| BW_LIMIT_INFO | 8 bits | If DECISION is 0x4, 0x5, 0xB, 0x11 or 0x12, Bandwidth Limit Information Otherwise, Type II Reserved Note that the network controller node MUST set each applicable bit to '1' independent of the other bits. |

TABLE 4-continued

Example L2ME Payload

| Field | Length | Usage |
|---|---|---|
| MAX_BURST_SIZE | 8 bits | The smallest value of the REM_BURST_SIZE reported by any egress node in Wave 0 of the Create or Update PQoS Flow Transaction. The value may be useful to a higher layer application at the Entry node to re-submit a Create/Update request with modified TSPEC parameters. |
| RESERVED | 8 bits | Type III as defined in the MoCA 1.1 Specification |
| MAX_PEAK_DATA_RATE | 32 bits | If DECISION is 0x4, 0x5, 0xB, 0x11 or 0x12, maximum allowable PQoS Flow peak data rate (bits/second) for assured successful create or update this PQoS Flow; otherwise ignore (reserved Type II) |
| POST_STPS | 32 bits | For Update Flow Transaction, if the DECISION is DECISION_SUCCESS, then this field contains total number of SLOT_TIMES/second allocated to all PQoS Flows after the decision; otherwise Type II Reserved. For Create Flow Transaction, this field always contains total number of SLOT_TIMES/second allocated to all PQoS Flows after the decision regarding Flow creation (regardless of the value of DECISION field). The total MUST include SLOT_TIMES/second for the newly created Flow, if DECISION is DECISION_SUCCESS. |
| POST_TXPS | 32 bits | For Update Flow Transaction, if the DECISION is DECISION_SUCCESS, then this field contains total number of Flow transmissions/second allocated to all PQoS Flows after the decision; otherwise Type II Reserved. For Create Flow Transaction, this field always contains total number of Flow transmissions/second allocated to all PQoS Flows after the decision regarding Flow creation (regardless of the value of DECISION field). The total MUST include Flow Transmissions/second for the newly created Flow, if DECISION is DECISION_SUCCESS. |

The DECISION field provides the outcome, as determined by the network controller node 305, of the Create or Update PQoS Flow request from the Entry node. Table 5, below, shows examples of meanings for possible values of this field defined in for a MoCA embodiment.

TABLE 5

List of Example Decision Values

| DECISION NAME | Value | Description |
|---|---|---|
| DECISION_SUCCESS | 0x1 | Create or Update Flow request is granted |
| DECISION_FLOW_EXISTS | 0x3 | Create Flow request rejected due to a node already acting as ingress for the specified PQoS Flow |
| DECISION_INSUF_INGR_BW | 0x4 | PQoS Flow cannot be created or updated due to insufficient bandwidth on Ingress Node data path; network controller provides the maximum feasible PQoS Flow bandwidth |
| DECISION_INSUF_EGR_BW | 0x5 | PQoS Flow cannot be created or updated due to insufficient bandwidth on Egress Node data path; network controller provides the maximum feasible PQoS Flow bandwidth |

TABLE 5-continued

List of Example Decision Values

| DECISION NAME | Value | Description |
|---|---|---|
| DECISION_TOO_MANY_FLOWS | 0x6 | Ingress or Egress nodes are unable to create the PQoS Flow |
| DECISION_INVALID_TSPEC | 0x8 | Node can't accept the received TSPEC value |
| DECISION_INVALID_DA | 0x9 | The requested PACKET_DA is unicast (only for Create PQoS Flow Transaction) |
| DECISION_LEASE_EXPIRED | 0xA | Update operation failed due to the PQoS Flow being deleted from the MoCA Network |
| DECISION_INVALID_BURST_SIZE | 0xB | Create or Update operation failed because the requested burst size T_BURST_SIZE is less than REM_BURST_SIZE for at least one of the Wave 0 Responses in this Transaction. |
| DECISION_FLOW_NOT_FOUND | 0x10 | This value MUST NOT be used during Create PQoS Flow Transaction. During Update PQoS Flow Transaction, this code indicates that the requested FLOW_ID does not match FLOW_ID of any PQoS Flow in the MoCA Network, |
| DECISION_INSUF_AGGR_STPS | 0x11 | Insufficient aggregated SLOT_TIMES/second on the MoCA Network |
| DECISION_INSUF_AGGR_TXPS | 0x12 | Insufficient PQoS Flow transmissions/second on the MoCA Network |
| DECISION_RETRY_NOTOK | 0xC | RETRANSMISSION cannot be enabled |

All DECISION values not listed in this table are Reserved for Future Use.

If an Update PQoS Flow operation fails, in one embodiment the existing PQoS flow still persists with its current TSPEC parameters.

From the allowed RESPONSE_CODE values shown in Table 3, if a node returns one of the RESPONSE_CODEs listed in the first column of Table 6, then the Request L2ME Frame for Wave 1 MUST contains the corresponding DECISION shown in Table 6. If a node returns more than one RESPONSE CODE values shown in Table 3, then the network controller node 305 may choose a DECISION value shown in Table 6 corresponding to any of the returned RESPONSE CODE values.

TABLE 6

Non-Bandwidth-related RESPONSE

| RESPONSE CODE NAME | Non-Bandwidth DECISION NAME |
|---|---|
| RESPONSE_CODE_FLOW_EXISTS | DECISION_FLOW_EXISTS |
| RESPONSE_CODE_TOO_MANY_FLOWS | DECISION_TOO_MANY_FLOWS |
| RESPONSE_CODE_INVALID_TSPEC | DECISION_INVALID_TSPEC |
| RESPONSE_CODE_INVALID_DA | DECISION_INVALID_DA |
| RESPONSE_CODE_LEASE_EXPIRED | DECISION_LEASE_EXPIRED |

In one embodiment, the network controller node 305 is configured to evaluate bandwidth-related criteria before permitting a PQoS flow to be created or updated. Examples of such criteria are shown in Table 7.

TABLE 7

Bandwidth-Related Criteria

Summed up STPS - the sum of EXISTING_STPS and the product of COST_XTPS and COST_STPTX values from all L2ME-capable nodes.

TABLE 7-continued

Bandwidth-Related Criteria

Summed up TXPS —the sum of EXISTING_TXPS and COST_TXPS values from all L2ME-capable nodes.
Ingress or egress node capacity - the returned REM_NODE_CAPACITY value at the ingress or egress nodes MUST be greater than or equal to the requested flow T PEAK DATA RATE.

In one embodiment, the network controller node is configured such that it must admit or update the PQoS Flow if all of the following conditions in Table 8 are satisfied.

TABLE 8

Conditions

The Summed up STPS is less or equal to QOS_STPS
The Summed up TXPS is less or equal to QOS_TXPS
The ingress node has sent RESPONSE_CODE = 0x1 and REM_NODE_CAPACITY greater than or equal to T_PEAK_DATA_RATE.
All egress nodes have sent RESPONSE_CODE = 0x2 and REM_NODE_CAPACITY greater than or equal to T_PEAK_DATA_RATE.
REM_BURST_SIZE greater than or equal to T_BURST_SIZE.
Both the Ingress node and the Egress have sent RETRY_OK In one embodiment, the network controller node 305 does not have to transmit a Response during Wave 0 to itself, and calculates and uses values of various fields shown in Table 2 in making a determination whether to grant or reject Create/Update Flow request. If one or more of the above five conditions are not satisfied, the network controller node 305 denies the Create or Update Flow request.

In the illustrated example, the network controller node 305 conveys the above decision as follows. The network controller node sends the decision to allow Flow creation or update in a Request L2ME Frame with DECISION=DECISION SUCCESS to the participating nodes in Wave 1 to commit the requested resources.

If the rejection of Create or Update request is due to a non-bandwidth related reason listed in Table 6, the network controller node sendd a Request L2ME Frame by using the appropriate value in the DECISION field to the participating nodes in Wave 1. If any one of the bandwidth-related criteria fails, then the network controller node calculates the MAX_PEAK_DATA_RATE value in the payload of the Request frame, which is the maximum allowable PQoS Flow T_PEAK_DATA_RATE that would have succeeded given T_PACKET_SIZE. When rejecting a Flow for bandwidth-related reason, the network controller node specifies the following conditions listed in Table 9 in Bits 3:0 of the BW_LIMT_INFO field.

TABLE 9

| Conditions | |
|---|---|
| 1) Bit 3: INSUF_ING_BW | Set to '1' iff the ingress node has responded with RESPONSE CODE 0x1 and REM NODE CAPACITY less than requested T_PEAK_DATA_RATE, |
| 2) Bit 2: INSUF_EGR_BW | Set to '1' iff any of the egress nodes has responded with RESPONSE CODE 0x2 and REM NODE CAPACITY less than requested T_PEAK_DATA_RATE, |
| 3) Bit 1: INSUF_AGGR_STPS | Set to '1' iff the summed up STPS if greater than QOS_STPS, |
| 4) Bit 0: INSUF_AGGR_TXPS | Set to '1' iff the summed up TPS if less or equal to QOS_TXPS |

Examples of the values of QOS_STPS and QOS_TXPS for different number of nodes in the MoCA Network that the network controller node uses are shown in Table 10 for MoCA 1.1.

TABLE 10

QOS_STPS and QOS_PPS value as a function of number of nodes in the MoCA Network

| Number of Nodes in the MoCA Network | QOS_STPS (in units of $10^6$ SLOT_TIME/second) | QOS_TXPS (units of Flow Tranmissions/second) |
|---|---|---|
| 2 | 31 | 8300 |
| 3 | 29.6 | 7900 |
| 4 | 27.7 | 7500 |
| 5 | 26 | 6850 |
| ≧6 | 25.1 | 6850 |

Note that addition of a new node to a MoCA Network of 2 to 5 nodes results in reduced QOS_STPS or QOS_TXPS thresholds, as shown in Table 10 (as an example) for future PQoS Flow creation or update calculations. It is not necessary to delete or update existing PQoS Flows if the admission of a new node causes the actual total SLOT_TIMEs/second or the total Flow Transmissions/second used by all PQoS Flows to exceed the new QOS_STPS or QOS_TXPS thresholds.

Upon receiving a Request L2ME Frame indicating a successful Create or Update PQoS Flow, the nodes for the PQoS flow commit the requested resources for the created or updated flow. This is illustrated in step 374. At operation 377, the nodes respond with a Response L2ME Frame with format. In one embodiment, the following additional restrictions are observed on various fields:

RESP STATUS: Bit 0≧set to '1'
L2ME_PAYLOAD=32 bit Type III reserved.

At operation 380, network controller node 305 initates Wave 2 315. in one embodiment, this is initiated by a wave 2 request using an L2ME frame. Wave 2 informs the Entry node 303 and other interested nodes 307 that the requested transaction was completed.

The following additional restrictions are preferably observed for various fields:

VENDOR_ID=0x0 (MoCA)
TRANS_TYPE=0x1 (QoS)
TRANS_SUBTYPE=0x1 (Create PQoS Flow) 0x2 (Update PQoS Flow)
DIR LEN=0x10
TXN WAVE N=0x2
L2ME PAYLOAD=of type "concatenated" with syntax, with the concatenated
responses from Wave 1.

The Create PQoS Flow/Update PQoS Flow Transaction is completed when the nodes provide their final Response L2ME Frame. This is shown at operation 384. The following additional restrictions are preferably observed on various fields.

RESP_STATUS "don't care". This field is reserved Type II.
L2ME_PAYLOAD=32 bit Type III reserved as specified in the MoCA 1.1 Specification.

In some cases, the addition of a node to the MoCA network may reduce the ability of the network controller node to guarantee transmission time for all committed PQoS Flows. For a PQoS Flow Create or Update Transaction the network controller node decides if the specific PQoS Flow request can be granted.

Various embodiments use flow cost to determine whether a request should be granted. The Cost of a Flow (CoF) is a measure of the specific bandwidth required to support a given PQoS Flow. For a Create or Update PQoS Flow transaction, the CoF is calculated by the ingress node and the network controller node uses this information to decide if the requested PQoS Flow is allowed. For integer values of AFACTOR (see Table 10), the CoF (number of SLOT_TIMES per second required for the Flow) calculated as follows:

$$CoF = N_{TXPS} * \max\left(T8, \left\{\frac{\left[\left(\frac{8*N_F}{OFDM_B}\right)\right]*}{(T_{CP}+T_{FFT})+T_{IFG}+T_{PRE}}\right\}\right) \quad \text{EQ(1)}$$

The first-term on the right-hand side of the equation is the number of OFDM symbols/Flow transmission where IX1 is the rounded-up integer of X. The CoFnew value obtained as above is the CoF for the new or updated Flow. The cost of all existing N flows for each ingress node is calculated by adding up CoF value for each Flow for which the node is the ingress node.

In some embodiments, for non-integer values of AFACTOR, the CoF calculation is subject to the certain limitations.

Examples of such limitations are: (1) For AFACTOR1<AFACTOR2, the (Cost of Flow for AFACTOR1) SHOULD be 2': (Cost of Flow for AFACTOR2); (2) The vendor proprietary calculation of CoF results in a cost of Flow less or equal to the CoF calculated as per Eq. 1 using AFACTOR=1.

The meaning of each variable used in the right hand side in the above equation is described in Table 11.

TABLE 11

Parameters used to Calculate Cost of Flow

| Parameter Name | Description |
| --- | --- |
| AFACTOR | A number ≧1 selected by the ingress node depending upon its ability to guarantee aggregation for flow transmissions. |
| $N_F$ | Number of bytes transmitted per Flow transmission. This number is equal to the sum of (T_PACKET_SIZE * AFACTOR), MAC Frame Header, Aggregation Header, Payload CRC, RS padding bytes and RS bytes. |
| $OFDM_B$ | Number of bits per OFDM symbol based on PHY Profile used for the transmission |
| $T_{CP}$ | Cyclic prefix length (number of SLOT_TIMES) |
| $T_{FFT}$ | IFFT/FFT period (number of SLOT_TIMEs) |
| $T_{IFG}$ | IFG period (number of SLOT_TIMEs) |
| $T_{PRE}$ | Length of the preamble per packet (number of SLOT_TIMES) |
| $N_{TXPS}$ | The total number of Flow Transmissions per second. This parameter is equal to (1000 * T_PEAK_DATA_RATE)/ (AFACTOR * 8 * T_PACKET_SIZE). |
| T8 | Minimum packet size |

The decision to aggregate Flow packets in one embodiment is left to the ingress node's discretion based on, for example, availability of MoCA Network transmission time and fullness of its input PQoS Flow buffers. The Entry node chooses T_PACKET_SIZE for a Flow to reflect size of Flow packets as they arrive from outside MoCA Network to Ethernet convergence layer (ECL) of the ingress node and SHOULD NOT attempt to explicitly influence the ingress node's aggregation decision via a T_PACKET_SIZE value that is different than the expected size of the Flow packets coming into the ingress node's ECL. The cost of buffering resources needed for supporting retransmission of a flow in a node is checked in a proprietary manner by that node.

Figure 6:
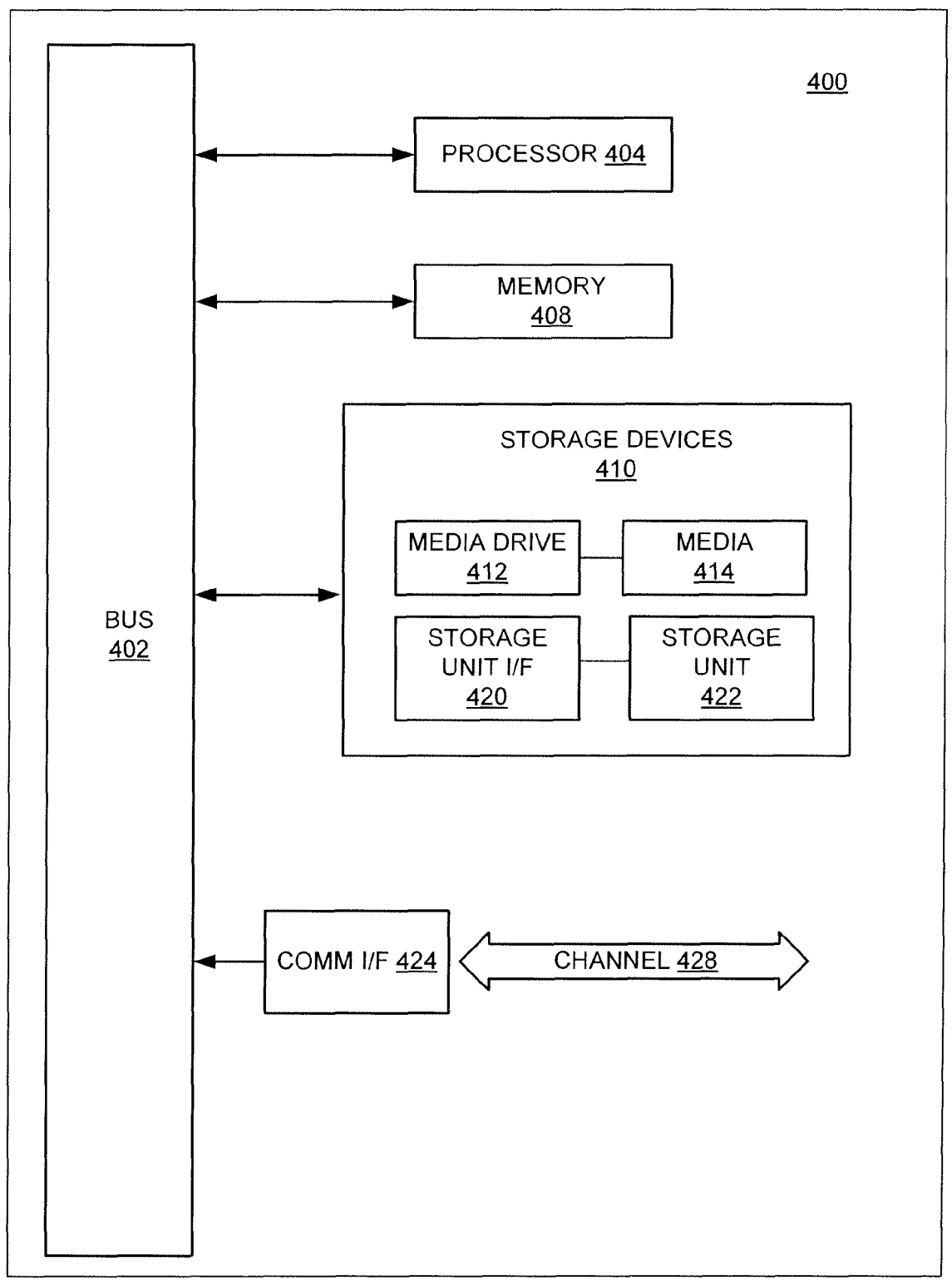
FIG. 6 illustrates an example computing module that may be used in implementing various features of embodiments of the disclosed method and apparatus.

As used herein, the term module might describe a given unit of functionality that can be performed in accordance with one or more embodiments of the disclosed method and apparatus. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the disclosed method and apparatus are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 400. After reading this description, it will become apparent to a person skilled in the relevant art how to implement the disclosed method and apparatus using other computing modules or architectures.

Referring now to FIG. 6, computing module 400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module 400 might be found in electronic devices such as, for example, digital cameras, navigation systems, cellular telephones, portable computing devices, modems, routers, wireless access points (WAPs), terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 408, storage unit 420, and media 414. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the disclosed method and apparatus as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The claimed invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described embodiments which are presented as mere examples for illustration only.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for retransmission admission in a Multimedia over Coax Alliance (MoCA) network having a network controller node and a plurality of associated network nodes, the method comprising:
   a) receiving in the network controller node a Level 2 Management Entity (L2ME) payload submission requesting creation of or update to a parameterized quality of service to support a retransmission flow;
   b) the network controller node sending a request L2ME frame message to a first plurality of nodes in the network to request information from the first plurality of nodes regarding whether the retransmission flow can be supported;

c) the network controller node receiving L2ME payload responses from the first plurality of nodes, wherein each response comprises information regarding whether its respective node can support the retransmission flow; and d) the network controller node determining whether the retransmission flow can be supported by the first plurality of network nodes based on a cost of flow as a measure of specific bandwidth required to support the retransmission flow, wherein the cost of flow is calculated as $$CoF = N_{TXPS} * \max\left(T8, \left\{\frac{\left[\left(\frac{8*N_F}{OFDM_B}\right)\right]*}{(T_{CP} + T_{FFT}) + T_{IFG} + T_{PRE}}\right\}\right),$$

where T8 is a minimum packet size, NTXPS is a total number of flow transmissions per second, NF is a number of bytes transmitted per flow transmission, OFDMB is a number of bits per Orthogonal Frequency Division Multiplexing (OFDM symbol), TCP is a cyclic prefix length, TFFT is an Inverse Fast Fourier Transform/ Fast Fourier Transform (IFFT/FFT)period, TIFG is an Inter-Frame Gap (IFG) period and TPRE is a length of the preamble per packet.

2. The method of claim 1, further comprising the network controller informing network nodes regarding whether the transmission flow can be supported.

3. The method of claim 1, wherein the information regarding whether the respective node of the first plurality of nodes can support a flow with retransmission comprises packet size, peak packet rate, burst characteristic, processing capacity and buffer space available to support retransmission.

4. The method of claim 1, wherein the determining in operation d) is based on sufficiency of bandwidth on an ingress node, sufficiency of bandwidth on an egress node, a quantity of supported retransmission flows, supported burst size of a node, and sufficiency of aggregated slot times.

5. The method of claim 1, further comprising network nodes for the retransmission flow committing requested resources to support the retransmission flow.

6. The method of claim 1, wherein the submission received in operation a) identifies nodes that comprise the first plurality of nodes.

7. The method of claim 1, wherein the request in operation b) is broadcast by the network controller to all nodes on the network.

8. The method of claim 1, wherein operation d) comprises the network controller broadcasting the received information regarding communication capabilities of the plurality of nodes to all of the nodes in the network.

9. A system, comprising:

a first node on a communications network, the first node comprising a first processor and a first computer executable program code embodied on a first computer readable medium, the first computer executable program code configured to generate a Level 2 Management Entity (L2ME) payload submission to a network control node on the network to request a creation of or an update to a parameterized quality of service to support a retransmission flow; and the network control node on the communications network, the network control node comprising a second processor and a second computer executable program code embodied on a second computer readable medium, the second executable program code configured to cause the network control node to perform the operations of receiving the submission requesting the creation of or update to a parameterized quality of service to support a retransmission flow; sending a request L2ME frame message to a first plurality of nodes in the network to request information from the first plurality of nodes regarding whether the retransmission flow can be supported; receiving L2ME payload responses from the first plurality of nodes, wherein each response comprises information regarding whether its respective node can support the retransmission flow; and determining whether the retransmission flow can be supported by the first plurality of network nodes based on a cost of flow as a measure of specific bandwidth required to support the retransmission flow, wherein the cost of flow is calculated as $$CoF = N_{TXPS} * \max\left(T8, \left\{\frac{\left[\left(\frac{8*N_F}{OFDM_B}\right)\right]*}{(T_{CP} + T_{FFT}) + T_{IFG} + T_{PRE}}\right\}\right),$$

where T8 is a minimum packet size, NTXPS is a total number of flow transmissions per second, NF is a number of bytes transmitted per flow transmission, OFDMB is a number of bits per Orthogonal Frequency Division Multiplexing (OFDM symbol), TCP is a cyclic prefix length, TFFT is an Inverse Fast Fourier Transform/ Fast Fourier Transform (IFFT/FFT)period, TIFG is an Inter-Frame Gap (IFG) period and TPRE is a length of the preamble per packet.

10. The system of claim 9, wherein the operation performed by the network control node further comprises informing network nodes regarding whether the retransmission flow can be supported.

11. The system of claim 9, wherein the information regarding whether a node can support a retransmission flow comprises packet size, peak packet rate, burst characteristic, processing capacity, and buffer space available to support retransmission.

12. The system of claim 9, wherein the determining is based on sufficiency of bandwidth on an ingress node, sufficiency of bandwidth on an egress node, a quantity of supported retransmission flows, supported burst size of a node, and sufficiency of aggregated slot times.

13. The system of claim 9, wherein network nodes for the retransmission flow are configured to commit requested resources to support the retransmission flow.

14. The system of claim 9, wherein the submission to the network control node identifies nodes that comprise the first plurality of nodes.

* * * * *